(12) United States Patent
Hornberger et al.

(10) Patent No.: US 7,965,004 B2
(45) Date of Patent: *Jun. 21, 2011

(54) ELECTRIC MOTOR

(75) Inventors: Joerg Hornberger, Dornstetten-Aach (DE); Christian Rudel, Koenigsfeld (DE); Siegfried Schreiner, Villingen-Schwenningen (DE)

(73) Assignee: EBM—Papst St. Georgen GmbH & Co. KG, St. Georgen (DE)

( * ) Notice: Subject to any disclaimer, the term of this patent is extended or adjusted under 35 U.S.C. 154(b) by 131 days.

This patent is subject to a terminal disclaimer.

(21) Appl. No.: 12/094,484

(22) PCT Filed: Nov. 22, 2006

(86) PCT No.: PCT/EP2006/011158
§ 371 (c)(1),
(2), (4) Date: May 21, 2008

(87) PCT Pub. No.: WO2007/062766
PCT Pub. Date: Jun. 7, 2007

(65) Prior Publication Data
US 2009/0230824 A1    Sep. 17, 2009

(30) Foreign Application Priority Data
Dec. 1, 2005  (DE) .......................... 10 2005 058 501

(51) Int. Cl.
*H02K 29/08* (2006.01)
(52) U.S. Cl. ................. 310/68 B; 310/156.05
(58) Field of Classification Search ........ 310/68 B, 310/68 R, 90, 91, 156.05–156.07; 318/400.38, 318/400.04–400.05, 463, 568.1, 652, 705, 714–715
See application file for complete search history.

(56) References Cited

U.S. PATENT DOCUMENTS 4,317,072 A * 2/1982 Goof et al. ............... 318/400.04
4,594,548 A   6/1986 Takahashi ................. 324/208
(Continued)

FOREIGN PATENT DOCUMENTS
DE    41 26 137 A    2/1992
(Continued)

OTHER PUBLICATIONS

Leitis et al/IEEE abs. entitled "Magnetoresistive Sensors ..." 2002, 2 PP.

(Continued)

*Primary Examiner* — Tran N Nguyen
(74) *Attorney, Agent, or Firm* — Milton Oliver, Esq.; Oliver Intellectual Property LLC

(57) ABSTRACT

An electric motor has a stator (12) as well as a rotor (14) rotatable about a rotation axis (85) and a sensor magnet (82) having an even number of sensor poles (71, 72, 73, 74). The sensor magnet (82) is configured to generate a magnetic flux having a magnetic flux density that changes sinusoidally with respect to the rotation angle. Two analog rotor position sensors (460, 465) are arranged on a support structure (468) at a distance from one another such that, during operation, they generate two sinusoidal signals (B_S1, B_S2) having a phase shift of 90° to each other. A signal generator (90) serves to generate at least one pulse-shaped signal (A, B) from the two sinusoidal rotor position signals (B_S1, B_S2) that are phase-shifted by 90°. The instantaneous rotation speed can be accurately determined from this pulse-shaped signal.

17 Claims, 9 Drawing Sheets

U.S. PATENT DOCUMENTS

| | | | | |
|---|---|---|---|---|
| 4,963,808 A | | 10/1990 | Torisawa | 318/685 |
| 4,982,125 A | * | 1/1991 | Shirakawa | 310/88 |
| 5,220,227 A | | 6/1993 | Ohi | 310/156 |
| 5,602,681 A | | 2/1997 | Nakayama | 359/698 |
| 5,625,353 A | | 4/1997 | Katagiri | 340/870 |
| 5,815,089 A | | 9/1998 | Katagiri | 340/870 |
| 5,977,671 A | * | 11/1999 | Kim | 310/89 |
| 6,232,687 B1 | | 5/2001 | Hollenbeck | 310/88 |
| 6,522,130 B1 | | 2/2003 | Lutz | 324/207 |
| 6,774,599 B2 | * | 8/2004 | Ishii | 318/652 |
| 6,876,110 B2 | | 4/2005 | Brown | 310/68 |
| 6,938,511 B2 | | 9/2005 | Meier et al. | 74/425 |
| 6,998,813 B2 | * | 2/2006 | Heizmann et al. | 318/400.38 |
| 7,394,174 B2 | * | 7/2008 | Blase et al. | 310/43 |
| 2002/0179987 A1 | | 12/2002 | Meyer et al. | 257/427 |

FOREIGN PATENT DOCUMENTS

| | | |
|---|---|---|
| DE | 10 2005-02830 | 8/2005 |
| EP | 0 313 046 | 4/1989 |
| EP | 1263119 A2 | 12/2002 |
| EP | 1 516 159 B1 | 11/2005 |
| JP | 2002-252946 | 9/2002 |
| JP | 2003-065796 | 3/2003 |
| WO | WO 00/04339 | 1/2000 |
| WO | WO 01-63210 A | 8/2001 |

OTHER PUBLICATIONS

Allegro Microsystems, A3280 Chopper-Stabilized Hall Effect Latches, 2008, 3 PP.

* cited by examiner

1100

1200

ELECTRIC MOTOR

The present invention relates to an electric motor associated with which, for electronic commutation thereof, is a rotation angle sensor apparatus.

Special pulse generators, for example optical encoders, are used in order to enable an accurate determination of the rotation speed and, if applicable, also other parameters such as rotation direction and rotational position, of electric motors. It is disadvantageous that such encoders are expensive, and that attaching them to electric motors is complex in terms of production engineering. In many cases the necessary space also does not exist because the electric motor must be installed into a machine. The attachment of such encoders to electric motors is additionally complex because they are usually arranged in the region of a shaft end of the electric motor, so that the latter then has only one free shaft end. This precludes the use of such a motor for some applications. Further disadvantages of such pulse generators may occur depending on the type of pulse generator. Optical encoders, for example, are sensitive to condensation and to soiling, which is problematic chiefly with those electric motors that are exposed to extreme environmental influences, for example on ships.

It is therefore an object of the invention to make available a novel electric motor.

This object is achieved by an electric motor according to claim 1. In an electric motor of this kind, analog rotor position signals of a specific shape and phase position are generated during operation by sensing the magnetic flux density of a sensor magnet arranged on the motor shaft. From these rotor position signals, at least one pulse-shaped signal is created by a signal generator, which signal enables a high-resolution determination of the rotation speed as well as a determination of rotation direction. Because detection of the magnetic field of the sensor magnet occurs magnetically in this context, functionality is guaranteed even in harsh environmental conditions. The production of such electric motors is moreover simple, uncomplicated, and economical, and a sensor apparatus of this kind can be very compact because the sensors can be arranged on a flat circuit board. It is thereby possible to accommodate in a small physical volume, with no loss of quality, a sensor apparatus for which substantially greater outlay was heretofore necessary.

Further details and advantageous refinements of the invention are evident from the exemplifying embodiments, in no way to be understood as a limitation of the invention, that are described below and depicted in the drawings. In the drawings.

Figure 1:
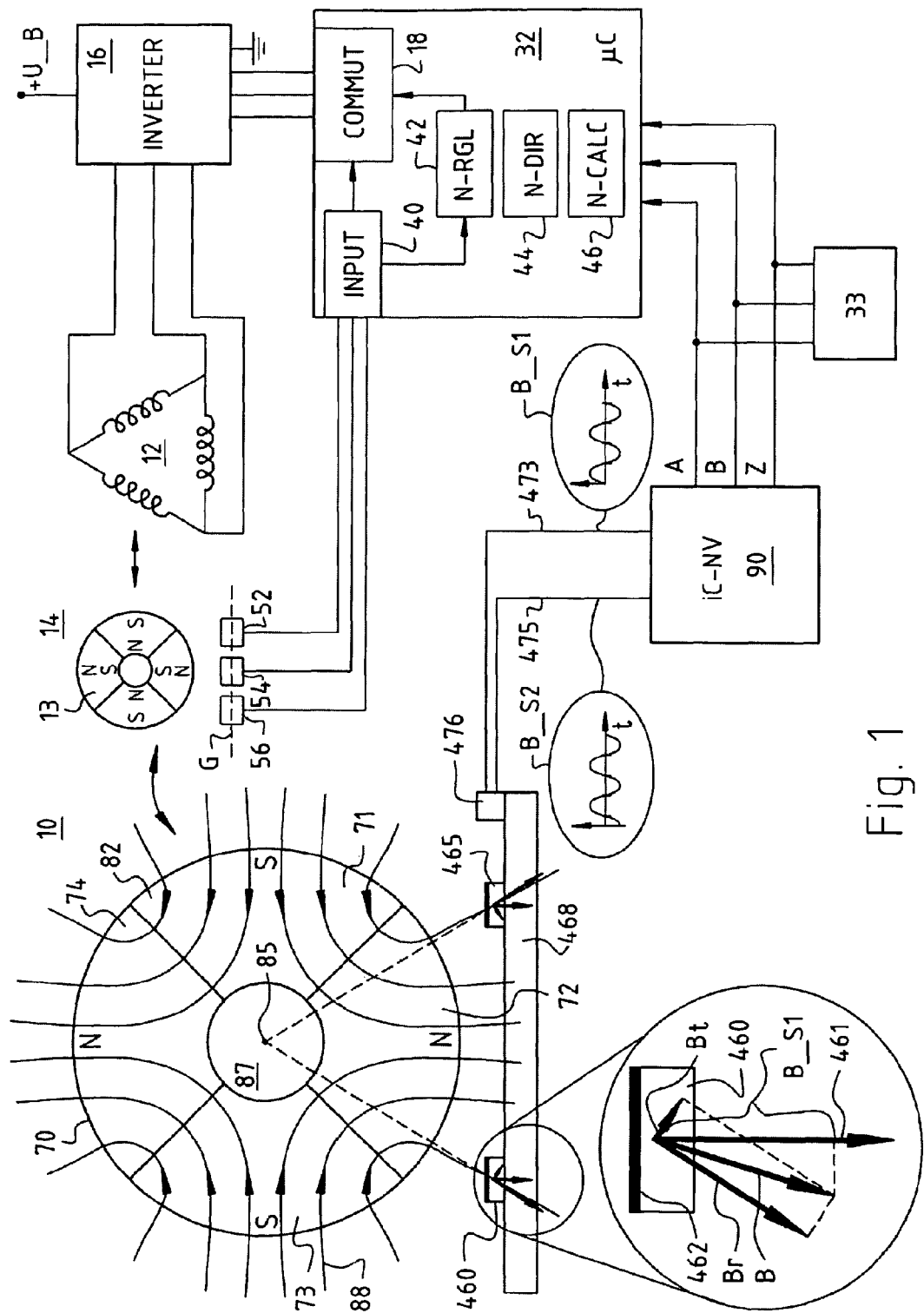
FIG. 1 shows an exemplifying embodiment of an electric motor according to the present invention.

FIG. 1 shows a three-phase electric motor 10 comprising a stator 12 and comprising a rotor 14 interacting with the latter and having a rotor magnet 13. The stator is depicted as a three-strand stator in a delta circuit. A microcontroller (microprocessor) µC 32, a signal generator 90 of the IC-NV type, and a power stage INVERTER 16 are associated with electric motor 10. µC 32 comprises an input device INPUT 40, a rotation speed controller N-RGL 42, a rotation direction determination device N-DIR 44, a rotation speed calculation device N-CALC 46, and a commutation controller COMMUT 18.

Microcontroller 32 is connected via commutation controller 18 to power stage 16, and via input device 40 to three digital rotor position sensors 52, 54, 56 that are implemented, by way of example, by digital Hall sensors of the A3280 type and generate, during operation, digital rotor position signals for the commutation of motor 10.

Figure 9:
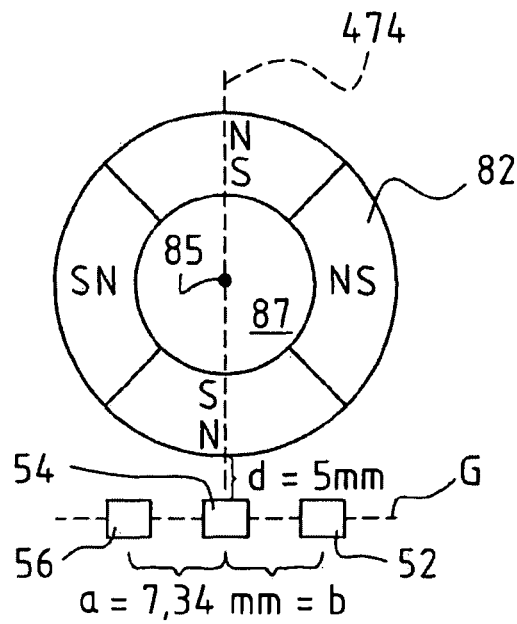
FIG. 9 shows a rotor position sensor arrangement according to an embodiment of the invention.

As is evident from FIG. 1, digital rotor position sensors 52, 54, 56 are preferably arranged on a straight line G in such a way that they generate rotor position signals having a phase difference of 60° el. from one another. Straight line G runs parallel to a tangent to the periphery of rotor 14. FIG. 9 shows an example of an arrangement of digital rotor position sensors 52, 54, 56 according to a preferred embodiment. Alternatively, digital rotor position sensors 52, 54, 56 can also be arranged radially on a circular path around rotor 14 at an angular distance of 60° el. (i.e. 30° mech. for a four-pole rotor) from one another.

Rotor position sensors 52, 54, 56 serve to sense the magnetic field of rotor magnet 13 during the operation of motor 10, in order to generate digital rotor position signals. The digital rotor position signals are delivered via input device 40 to commutation controller 18 and to rotation speed controller 42. Rotation speed controller 42 determines an actual rotation speed value of rotor 14 from the digital rotor position signals and, using the actual rotation speed value, generates a rotation speed control variable that is delivered to commutation controller 18. Commutation controller 18 generates, as a function of the rotation speed control value, commutation signals to drive power stage 16, which drives stator 12 as a function of said commutation signals.

Electric motor 10 has a four-pole permanent-magnet sensor magnet 82 that is arranged on a shaft 87 of rotor 14, the rotation axis of said shaft being labeled 85. Two analog rotor position sensors 460, 465 serve to sample the magnetic field of said sensor magnet 82 during the operation of motor 10 in order to generate analog rotor position signals B_S1 and B_S2. The invention is not, however, limited to a specific type of rotor position sensor; different types of analog rotor position sensors can instead be used. For example, analog Hall sensors such as, for example, analog Hall sensors of the A1321 type, AMR Hall sensors, or GMR (giant magnetoresistive) sensors can be utilized as rotor position sensors. In addition, programmable sensors such as, for example, sensors of the Sentron 2SA-10 type can also be used. Analog rotor position signals B_S1 and B_S2 generated by rotor position sensors 460, 465 are delivered, in FIG. 1, via a plug connector 476 and conductor pairs 473, 475 respectively, to signal generator 90 so that the latter generates, from analog signals B_S1 and B_S2, digital signals A, B, and Z that are delivered to microcontroller 32 or to an internal or external evaluation apparatus 33.

Figure 10:
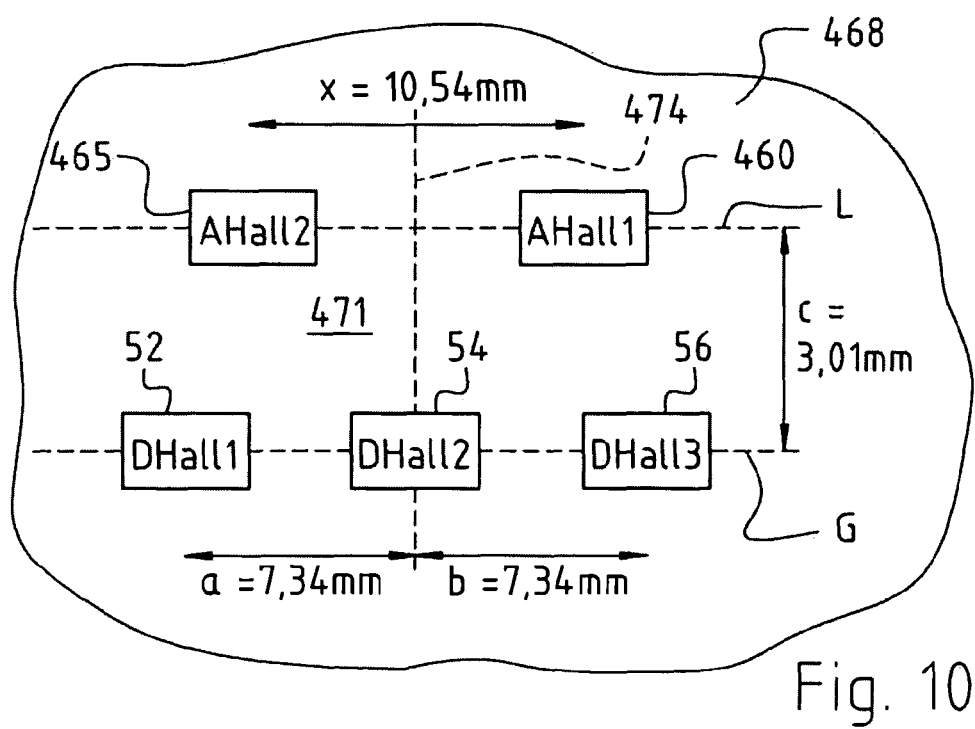
FIG. 10 shows a sensor arrangement having five rotor position sensors arranged symmetrically in two different planes.

Analog rotor position sensors 460 and 465 are preferably arranged in a common plane on a support arrangement, here in the form of a circuit board 468, sensors 460, 465 being, for example, soldered onto circuit board 468. Signal generator 90, microcontroller 32, and power stage 16 can also be arranged at least in part on circuit board 468. In a preferred embodiment, digital rotor position sensors 52, 54, 56 are additionally arranged on said circuit board 468, the digital rotor position signals generated by them being, in this embodiment, generated by sampling the magnetic field of sensor magnet 82 during operation. Sensor magnet 82 is fixedly joined to rotor 14 via shaft 87, and thus enables an evaluation of the magnetic field of sensor magnet 82 by way of digital rotor position sensors 52, 54, 56, and the determination, necessary for commutation and rotation speed control, of the rotation speed of rotor 14 of motor 10. FIG. 10 shows an example of an arrangement of rotor position sensors 460, 465, 52, 54, 56. These lie in the same plane, usually on a flat circuit board.

The use of digital rotor position sensors 52, 54, 56 is optional, since the information necessary for generation of the commutation signals can also be determined by corresponding evaluation of the analog rotor position signals B_S1 and B_S2. This evaluation is, however, more complex and thus more expensive than the use of conventional components and structures, i.e. than the use of digital rotor position sensors 52, 54, 56.

Operation

Sensor magnet 82 is of annular configuration with a substantially cylindrical surface, and has four poles 71, 72, 73, and 74. It generates a substantially sinusoidal magnetic field 88 and a substantially sinusoidal magnetic flux density B, which is depicted by way of example in FIG. 4. The magnetization depicted for sensor magnet 82 is referred to as pole-oriented or pole-oriented lateral, and the magnetization within a pole is not homogeneous, but changes its direction and intensity as a function of location, whereas with, for example, a diametrically magnetized magnet, the magnetization within a pole is homogeneous and always points in the same direction.

FIG. 1 shows, in the enlarged view of rotor position sensor 460, the so-called sensitive area 462 in which measurement takes place. Rotor position sensor 460 detects only that component of the vector magnetic flux density B that points in the direction of normal line 461 onto sensitive area 462. Because rotor position sensor 460 is not arranged tangentially with respect to sensor magnet 82, it detects (unlike the case with usual arrangements) not only radial component B r of magnetic flux density B but also its tangential component B_t. The component of magnetic flux density B pointing in the direction of normal line 461 is labeled B_S1, and this corresponds to the signal measured by rotor position sensor 460 (S1).

Despite the non-tangential arrangement of rotor position sensors 460 and 465, a sensor magnet 82 having a sinusoidal field profile also yields sinusoidal signals B_S1 and B_S2, which exhibit a phase difference as a function of the geometric arrangement (dislocation) of rotor position sensors 460, 465. According to a particularly preferred embodiment of the invention, rotor position sensors 460, 465 are arranged at the periphery of the four-pole sensor magnet 82 in such a way that said phase difference equals 90°, so that B_S1 represents a sine signal and B_S2 a cosine signal.

Sine signal B_S1 and cosine signal B_S2 are delivered to signal generator 90, which generates therefrom the two digital signals A and B having a phase difference of 90° from one another. Signal A is generated, for example, for sine signal B_S1, a predetermined number of pulses being generated for signal A for each electrical revolution (360° el.) of sensor magnet 82, i.e. each sine period of B_S1. Preferably, 16 pulses are generated in this context for signal A. Because sensor magnet 82 has four poles in the present example, B_S1 encompasses two sine periods for each mechanical revolution (360° mech.) of sensor magnet 82, so that 32 pulses are generated for signal A for each mechanical revolution. This applies analogously to the generation of a signal B from B_S2, so that signal B likewise comprises 32 pulses for each mechanical revolution of sensor magnet 82.

Also produced from signals B_S1 and B_S2 is a digital signal Z that, for example, can exhibit only two different values "HIGH" and "LOW," and that preferably changes only once from LOW to HIGH and only once from HIGH back to LOW for each sine period of B_S1 (or B_S2). Signal Z serves for zero-point determination and for safety, and is used in particular when a commutation is accomplished on the basis of signals A and B. Because signals A and B generate a plurality of pulses (e.g. 16) for each electrical revolution, it is not possible to unequivocally detect, for example, a pole change solely on the basis of signals A and B.

Using digital signals A and B, a high-resolution rotation speed calculation for sensor magnet 82, and—since the latter is fixedly joined via shaft 87 to rotor 14—for rotor 14 of electric motor 10, can be performed in device 46 for rotation speed calculation. For this, signals A and B can be logically combined with one another prior to an evaluation by device 46 (FIG. 1). For example, an XOR logical combination of signals A and B can generate a combined signal having a total of 64 pulses for each mechanical revolution of sensor magnet 82, which signal enables a high-resolution rotation speed calculation. Alternatively, signal processing can also occur in an evaluation apparatus 33. A rotation speed calculation according to the present invention is necessary in particular for applications with very slow-running motors, especially at rotation speeds in the range from 0 rpm to approximately 100 rpm. At such low rotation speeds, the time intervals between the signal changes of digital rotor position sensors are so long that an accurate rotation speed determination is no longer possible. Accurate rotation speed control is therefore also no longer possible. It is in just such cases that optical encoders were hitherto often used.

To determine the rotation direction of sensor magnet 82 and thus of rotor 14, digital signals A and B can be evaluated by device 44 that serves for the determination of rotation direction. For example, the rotation direction of rotor 14 can be ascertained by a comparison of the two signals A and B in consideration of the 90° phase difference of said digital signals.

In addition, an absolute value for the electrical revolution of sensor magnet 82 (and thus of rotor magnet 13) can be calculated from digital signals A and B using the Z signal, since the Z signal is suitable for zero point determination. In a configuration of sensor magnet 82 with SP=2 sensor poles, this electrical absolute value corresponds to the absolute value for the mechanical revolution of sensor magnet 82, and an unequivocal value can thus be allocated to each rotation angle of rotor 14 independently of the number of poles RP of rotor magnet 14.

For sensor magnets having a number of sensor poles SP that is greater than the number of rotor poles RP, the rotation angle cannot be exactly indicated immediately after the motor is switched on, either electrically with reference to the rotor or mechanically, without adding to the apparatus; instead, it is necessary first to perform an initialization in order to achieve a defined initial state. This is often not tolerable for safety-relevant applications.

Figure 2:
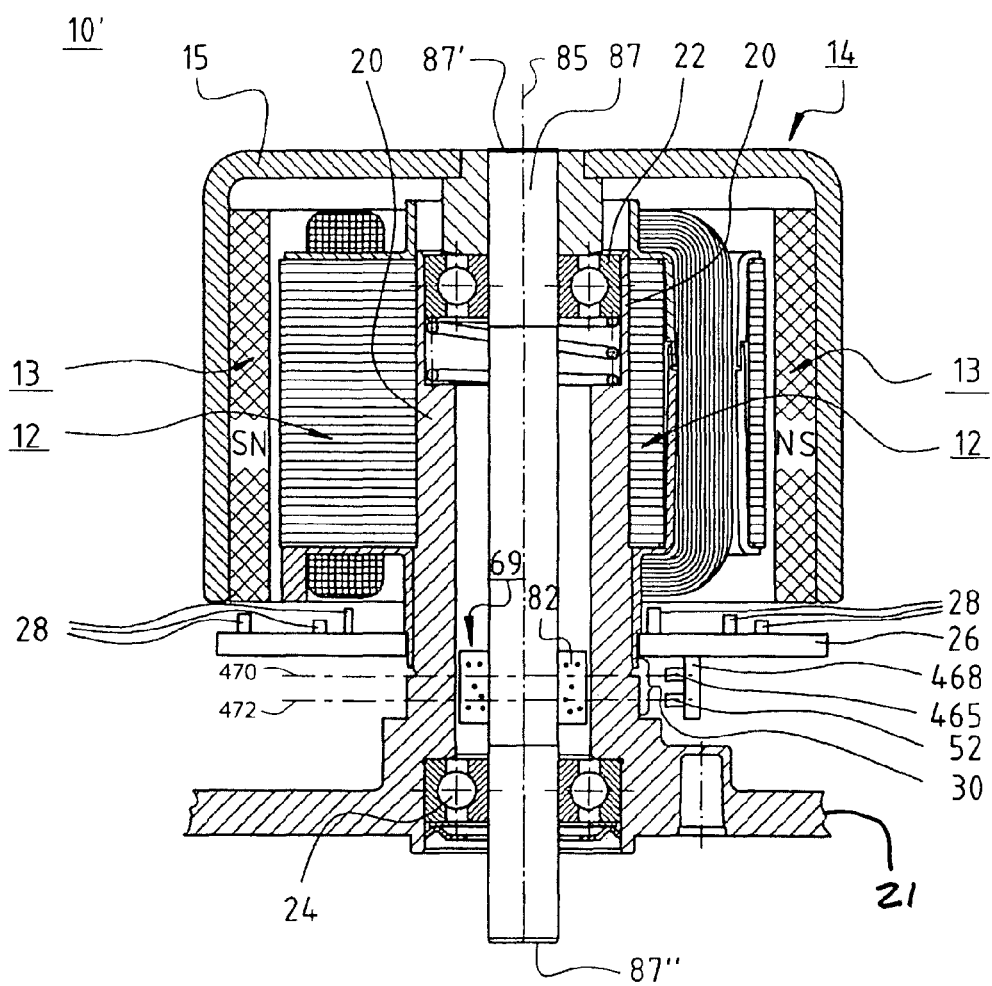
FIG. 2 is a longitudinal section through an exemplifying embodiment of an external-rotor motor according to the present invention.

FIG. 2 is a section through rotation axis 85 of a schematically depicted external-rotor motor 10'. The latter comprises a bearing tube 20 in which shaft 87' is journaled by two radial bearings 22, 24. Bearing tube 20 has a flange 21 at the bottom. Stator 12 is mounted on bearing tube 20. A rotor cup 15 is mounted on shaft 87, and mounted in said cup is permanently magnetic rotor magnet 13, so that the latter is located opposite stator 12 and can interact with it.

A circuit board 26 having electrical and electronic components 28 is arranged on bearing tube 20. The (flat) circuit board 468 (FIG. 1), having analog rotor position sensor 465 and digital rotor position sensor 52 as well as rotor position sensors 460, 54, 56 (not depicted), is attached to circuit board 26 so that circuit board 468 extends parallel to rotation axis 85. The arrangement of rotor position sensors 460, 465, 52, 54, 56 on circuit board 468 enables simple and inexpensive assembly. In this context, rotor position sensors 460, 465, 52, 54, 56 are preferably arranged on the side of circuit board 468 located opposite from sensor magnet 82, in order to decrease the influence of circuit board 468 on magnetic flux B.

The schematically depicted sensor ring magnet 69 having sensor magnet 82 is arranged in twist-proof fashion on shaft 87 in such a way that rotor position sensors 460, 465, 52, 54, 56 are located in the cylindrical peripheral region of sensor magnet 82. Because sensor ring magnet 69 is located inside bearing tube 20 in this exemplifying embodiment, bearing tube 20 located between sensor ring magnet 69 and rotor position sensors 460, 465, 52, 54, 56 is preferably fabricated from a magnetically nonconductive material such as, for example, aluminum or plastic. Alternatively, sensor ring magnet 69 could also be arranged outside bearing tube 20, for example below flange 21 in FIG. 2; the arrangement depicted is, however, preferred.

Analog sensors 465, etc. are located where a first plane 470 extending perpendicularly to rotation axis 85 intersects circuit board 468. Digital sensors 52, etc. are located where a second plane 472 extending perpendicularly to rotation axis 85 intersects circuit board 468. Plane 470 intersects circuit board 468 along a line labeled L in FIG. 10, and plane 472 intersects circuit board 468 along a line labeled G in FIG. 10. The relevant Hall sensors are arranged on these respective lines L and G, as shown in FIG. 10.

As FIG. 2 shows, plane 470 preferably extends through sensor magnet 82, so that the analog Hall sensors on circuit board 468 are not located in the leakage flux region of sensor magnet 82, but are located where said magnetic flux is greatest.

Plane 472 also preferably extends, for the same reason, through sensor magnet 82.

Shaft 87 is preferably fabricated from a magnetically conductive material, for example a ferromagnetic steel, so that it can act as a magnetic yoke for sensor magnet 82. A shaft made of a magnetically nonconductive material, for example stainless steel or plastic, is, however, also possible.

One particular aspect of the arrangement of FIG. 2 is that neither sensor magnet 82 nor rotor position sensors 460, 465, 52, 54, 56 are arranged at a shaft end or along the extension of shaft ends 87', 87", but instead both shaft ends 87', 87" are unoccupied and can be used. This can accordingly be referred to as a decentralized arrangement, and this makes possible new applications, in particular applications in which both shaft ends 87', 87" of the electric motor are required for drive purposes, i.e. can be equipped with a rotation angle sensor apparatus according to the present invention.

In an internal-rotor motor (not depicted) or a fan, sensor ring magnet 69 can be arranged in the same fashion on the shaft. The rotation angle sensor apparatus according to the present invention is thus universally usable.

Figure 3:
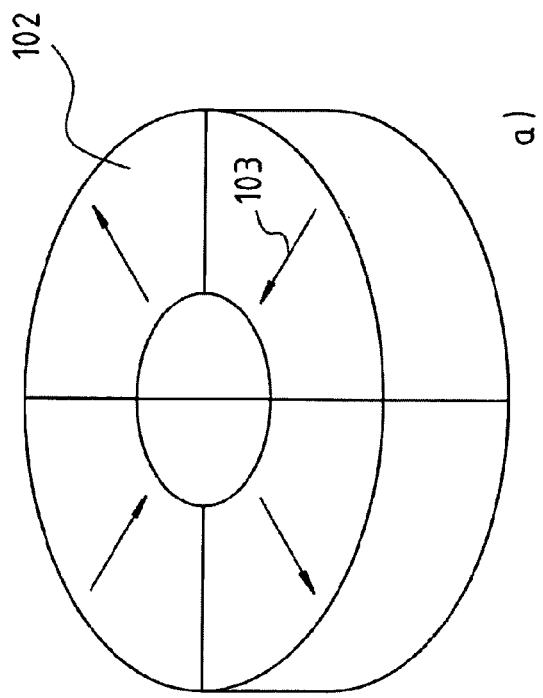
FIG. 3 shows a sensor magnet in which the poles are homogeneously magnetized, and the resulting magnetic flux density.
Figure 3:
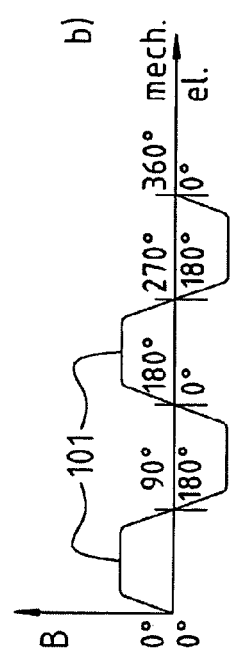

FIG. 3 shows a four-pole sensor magnet 102 in which the individual poles are magnetized homogeneously and in one direction. The magnetization is labeled 103. The resulting magnetic flux density B at the periphery is plotted below against the mechanical and the electrical rotation angle, and a trapezoidal curve for magnetic flux density B results. Evaluation in the middle of the pole is difficult because of plateau 101.

Figure 4:
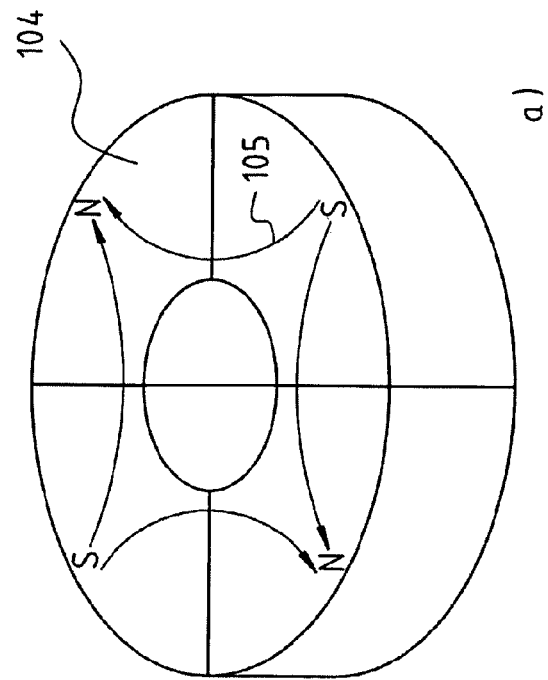
FIG. 4 shows a sensor magnet having a sinusoidal magnetization, and the resulting magnetic flux density.
Figure 4:
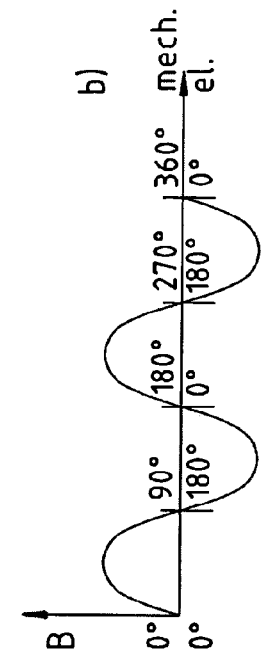

FIG. 4 shows a four-pole sensor magnet 104 having a magnetization that can be referred to as pole-oriented and lateral (in contrast to an axial magnetization that is also possible). Magnetization 105 proceeds in arc-shaped fashion through the magnet. The magnetic flux density measured at the periphery is plotted analogously to FIG. 3. What results is a substantially sinusoidal profile for magnetic flux density B, which profile is particularly suitable for evaluation.

Figure 5:
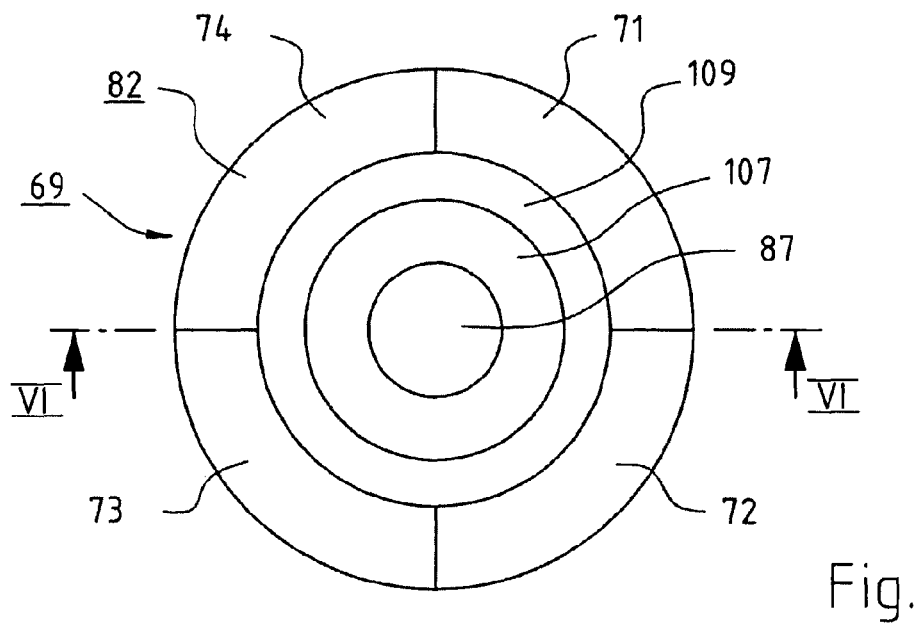
FIG. 5 is a plan view of a sensor ring magnet according to the present invention.
Figure 6:
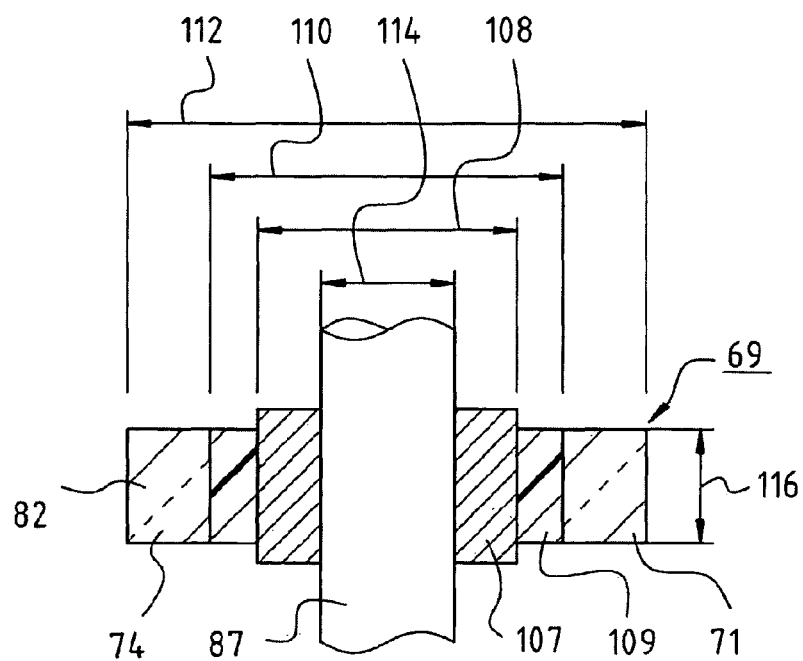
FIG. 6 is a section through the sensor ring magnet along line VI-VI of FIG. 5.

FIG. 5 is a plan view of sensor ring magnet 69 of FIG. 2, and FIG. 6 is a section through sensor ring magnet 69 that is mounted on shaft 87. Sensor ring magnet 69 comprises: sensor magnet 82 having the four sensor poles 71, 72, 73, and 74; a metal ring 107; and a plastic ring 109 joining sensor poles 71 to 74 to metal ring 107.

Metal ring 107 sits on shaft 87 and is joined nonrotatably thereto. Brass is preferably used for metal ring 107. Plastic 109 is, for example, introduced by an injection-molding process between metal ring 107 and sensor magnet 82, in order to join them and at the same time to create compensation for stresses that might result from thermal expansion and might otherwise cause sensor ring magnet 82 to burst.

The outside diameter of sensor magnet 82 is labeled 112 and equals, for example, 37 mm. The outside diameter is preferably in the range of 15 mm to 50 mm, more preferably in the range of 20 to 40 mm. The inside diameter of sensor magnet 82 or the outside diameter of plastic ring 109 is labeled 110 and equals, for example, 27 mm. The inside diameter of plastic ring 109 or the outside diameter of metal ring 107 is labeled 108 and equals, for example, 20 mm. The diameter of shaft 87 is labeled 114 and equals, for example, 8 mm. Preferred values for diameter 114 of the shaft are in the range of 5 mm to 15 mm, but larger and smaller diameters are possible depending on motor size.

The inside diameter of metal ring 107 is preferably selected so that a good join to shaft 87 is produced. The use of an inner metal ring 107 is advantageous because sensor magnet 82 can be fabricated in one or more standard sizes, and sensor ring magnet 69 can be adapted to shaft 87 by way of an inexpensively manufactured change in inside diameter 114 of metal ring 107.

The width of magnet material 71 to 74 is labeled 116. Width 116 of sensor magnet 69 equals, for example, 7 mm. The width for an exclusive sensor magnet, i.e. one that does not simultaneously serve as a rotor magnet, is preferably in the range of 3 mm to 20 mm, more preferably in the range of 5 mm to 15 mm, and particularly preferably in the range of 6 mm to 12 mm.

The number of sensor poles SP is preferably SP=2, 4, 6, or 8, and particularly preferably SP=2 or 4.

In applications in which sensor ring magnet 69 is located in a corrosive environment, it can additionally be surrounded by a (preferably magnetically nonconductive) corrosion-resistant material. For example, it is possible to weld the sensor magnet into magnetically nonconductive special steel. With a sensor ring magnet 69 of this kind it is possible, for example, to implement an immersion motor in which the shaft is surrounded by cooling liquid.

Figure 7:
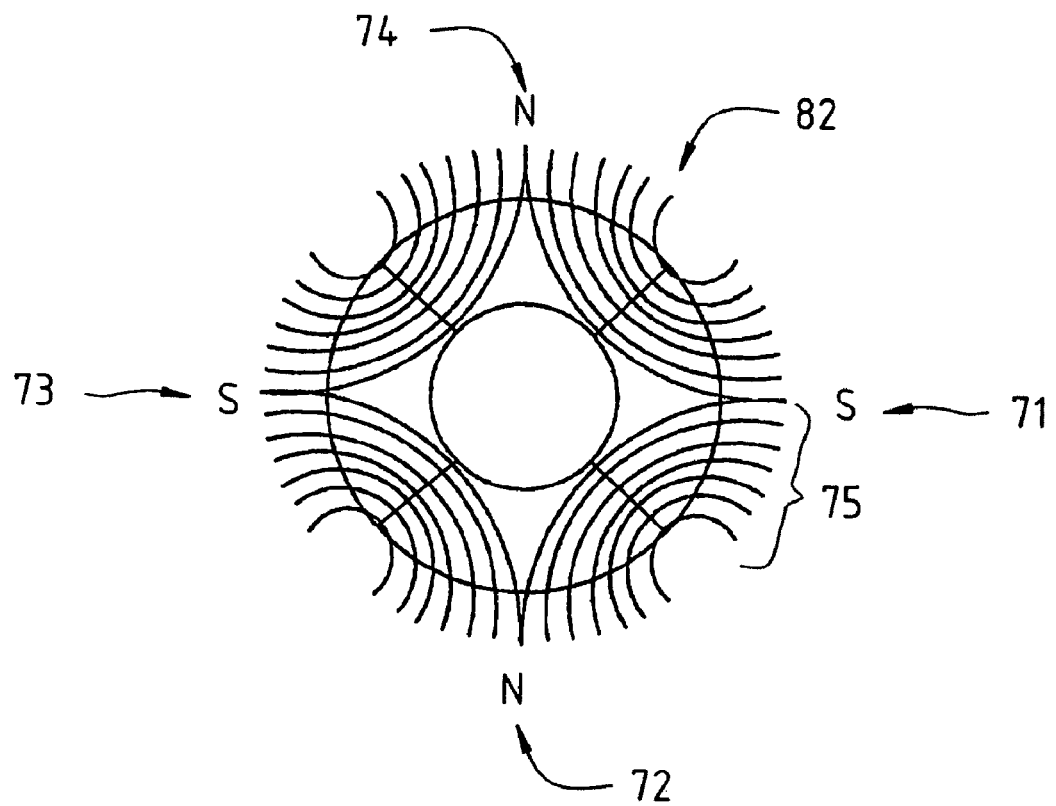
FIG. 7 depicts the profile of the magnetic field lines in the context of a sensor magnet having a sinusoidal flux profile.

FIG. 7 is a more detailed depiction of the magnetic field or magnetic flux lines of the annular sensor magnet 82 of FIG. 1.

Sensor magnet 82 is implemented with four poles, and comprises the two North poles 72, 74 (N) and the two South poles 71, 73 (S). Sensor magnet 82 is magnetized sinusoidally, so that a substantially sinusoidal magnetic flux profile is produced at its outer periphery. The magnetic flux profile between the individual magnetic poles 71, 72, 73, 74 that is determined by the magnetization is indicated by corresponding magnetic field lines 75.

Sensor magnet 82 preferably has a substantially cylindrical shape. A 13/22 p hard ferrite compound per DIN 17 410 is, for example, suitable as a magnet material.

Figure 8:
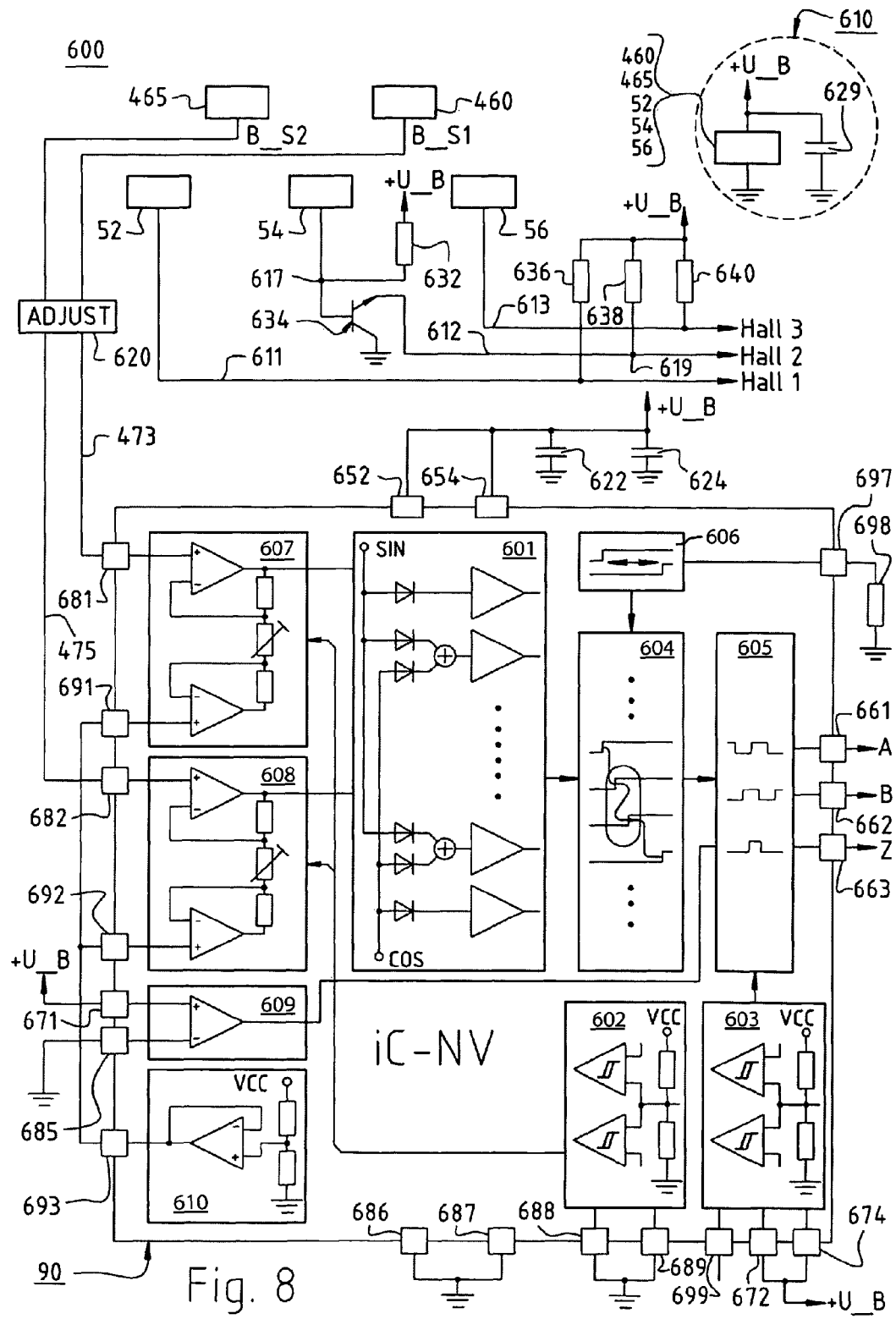
FIG. 8 is a simplified circuit diagram with a signal generator according to the present invention.

FIG. 8 shows a simplified circuit diagram 600 with digital rotor position sensors 52, 54, 56 and analog rotor position sensors 460 and 465 of FIG. 1, which are connected via leads 473 and 475, respectively, to signal generator 90. Unlike in FIG. 1, in FIG. 8 there is arranged between analog rotor position sensors 460 and 465 and signal generator 90 a device ADJUST 620 that serves to adapt analog rotor position signals B_S1 and B_S2 for use by signal generator 90. Signals B_S1 and B_S2 can here be adjusted, if necessary, in such a way that they have the same offset and amplitude. This increases measurement accuracy. A corresponding circuit is known, for example, from WO 2004/001341 A1 (PCT 266), to whose content reference is made in the interest of brevity.

FIG. 8 shows, by way of example, the use of a signal generator of the iC-NV type, of the iC-Haus company. This signal generator 90 serves to generate signals A, B, and Z. Its terminals are labeled as follows:

| | |
|---|---|
| 681 | PSIN |
| 682 | PCOS |
| 652 | Vcc |
| 654 | VDD |
| 661 | A |
| 662 | B |
| 663 | Z |
| 671 | PZERO |
| 672 | SF1 |
| 674 | SF0 |
| 685 | NZERO |
| 686 | GNDA |
| 687 | GND (ground) |
| 688 | SG1 |
| 689 | SG0 |
| 691 | NSIN |
| 692 | NCOS |
| 693 | VREF |
| 697 | RCLK |
| 699 | NROT |

The signals from inputs 681, 691 are delivered to an INPUT SIN module 607. Analogously, the signals from inputs 682, 692 are delivered to an INPUT COS module 608. The signals from inputs 671, 685 are delivered to an INPUT ZERO module 609, and a reference voltage VREF is present at output 693 of a module 610 (VREF).

The number 601 designates a CONVERSION CORE module, 602 is a GAIN SELECT module for adjusting the gain, and 603 is a STEP/CYCLE SELECT module. 604 is a TRANSITION DISTANCE CONTROL module, 605 is a DIGITAL PROCESSING module for digital processing, and 606 is a TRANSITION DISTANCE PRESET module.

Signal generator 90 thus has a plurality of terminals and modules for processing sine signal B_S1 and cosine signal B_S2 in order to generate digital signals A, B, and Z therefrom. As FIG. 8 shows, signal generator 90 is connected via its terminal PSIN 681 to lead 473 for sine signal B_S1, and via its terminal PCOS 682 to lead 475 for cosine signal B_S2. Via its terminals VCC 652 and VDD 654, signal generator 90 is connected to an operating voltage +U_B of preferably +5 V, which is connected, via a parallel circuit of a first capacitor 622 of preferably 100 nF and a second capacitor 624 of preferably 10 (mu) F, to ground for voltage smoothing. Operating voltage +U_B is likewise connected to signal generator 90 via the latter's terminals PZERO 671, SF1 672, and SF0 674. Terminals NZERO 685, GNDA 686, GND 687, SG1 688, and SG0 689 of signal generator 90 are connected to ground, and its terminals NSIN 691, NCOS 692, and VREF 693 are respectively connected to one another. Terminal ROT 699 is unoccupied, and terminal RCLK 697 is connected to ground via a resistor 698 of preferably 500 kohm. Digital signals A, B, and Z are outputted at terminals A 661, B 662, and Z 663 of signal generator 90.

According to a preferred embodiment of the invention, signal generator 90 is implemented using an iC-NV Sin/D Flash Converter interpolator of the iC-Haus company. A detailed description of the manner of operation of signal generator 90 for the generation of digital signals A, B, and Z is therefore omitted. It is nevertheless noted that other commercially available signal generators or specially produced circuits are also usable for the generation of digital signals A, B, and Z.

FIG. 8 also shows a preferred circuit for digital rotor position sensors 52, 54, 56. Sensor 52 is connected on the output side, via a lead 611 that is connected via a resistor 636 of preferably 4.7 kohm to operating voltage +U_B, to input device 40 (not depicted) of FIG. 1 in order to transfer a digital rotor position signal Hall 1. By analogy therewith, sensor 56 is also connected on the output side, via a lead 613 that is connected via a resistor 640 of preferably 4.7 kohm to operating voltage +U_B, to input device 40 in order to transfer a digital rotor position signal Hall 3. Sensor 54 is connected on the output side to a node 617. The latter is connected, via a resistor 632 of preferably 4.7 kohm, to operating voltage +U_B. Node 617 is additionally connected to the base of a bipolar transistor 634. The emitter and the collector of bipolar transistor 634 are connected respectively to ground and, via a line 612, to a node 619 for transfer of a digital rotor position Hall 2. Node 619 is connected, via a resistor 638 of preferably 4.7 kohm, to +U_B. This circuit results in an inversion of signal Hall 2. If signals Hall 1, Hall 2, and Hall 3 are to have a level different from that of operating voltage +U_B, resistors 636, 638, 640 can be connected to an appropriately adapted voltage.

As is evident from a detail view 610 of FIG. 8, each of the rotor position sensors 460, 465, 52, 54, 56 is also connected on the input side to operating voltage +U_B, which is respectively connected, via a capacitor 629 of preferably 100 nF, to ground for voltage smoothing.

FIG. 9 shows the four-pole sensor magnet 82 and the three digital rotor position sensors 52, 54, 56 of FIG. 1 in an arrangement according to a preferred embodiment of the invention. Here sensors 52, 54, 56 are arranged in one plane that extends parallel to rotation axis 85 of sensor magnet 82. In this plane, digital rotor position sensors 52, 54, 56 are arranged with respect to one another, on straight line G extending parallel to a tangent to sensor magnet 82, in such a way that the resulting rotor position signals exhibit a phase difference of 60° el. Sensors 52, 54, 56 thus each generate 12 pulses for each mechanical revolution of sensor magnet 82.

In the preferred exemplifying embodiment, distance d from the middle rotor position sensor 54 to the outer periphery of sensor magnet 82 is d=5 mm. Distance a from sensor 56 (depicted to the left in FIG. 9), and distance b from sensor 52 (depicted to the right in FIG. 9), to the middle sensor 54 are a=b=7.34 mm. It is noted, however, that these dimensions refer to the sensor types and dimensions, and the polarization of sensor magnet 82, described above, and can thus vary as a function thereof.

FIG. 10 shows the three digital rotor position sensors 52, 54, 56 and the two analog rotor position sensors 460 and 465 of FIG. 1 in an arrangement according to a preferred embodiment of the invention. Here sensors 52, 54, 56, 460, and 465 are arranged in one plane 471 of circuit board 468, which plane 471 extends parallel to rotation axis 85 (not depicted) of sensor magnet 82. This plane 471 is defined in FIG. 2 by the circuit board, and corresponds in FIG. 10 to the plane of the page.

In plane 471, digital rotor position sensors 52, 54, 56 are arranged, as described in FIG. 9, on straight line G. Analog rotor position sensors 460 and 465 are arranged on a straight line L likewise extending parallel to a tangent to sensor magnet 82, which line furthermore extends parallel to line G. The sensors are arranged symmetrically with respect to a plane of symmetry 474 that is drawn as a dashed line 474. In the region of this line 474, circuit board 468 is at its smallest distance d (FIG. 9) from sensor magnet 82.

In a preferred embodiment, distance c from line L to line G is c=3.01. Distance x from analog sensor 460 to analog sensor 465 is in this case x=10.54 mm, each of sensors 460 and 465 being arranged at the same distance away from rotation axis 85 of sensor magnet 82. Distances a and b of digital sensors 52, 54, 56 from one another are, as described in FIG. 9, a=b=7.34 mm. It is noted yet again, however, that these dimensions refer to the sensor types and dimensions, and the polarization of sensor magnet 82, described above, and can thus vary as a function thereof. These dimensions illustrate the compact construction.

Figure 11:
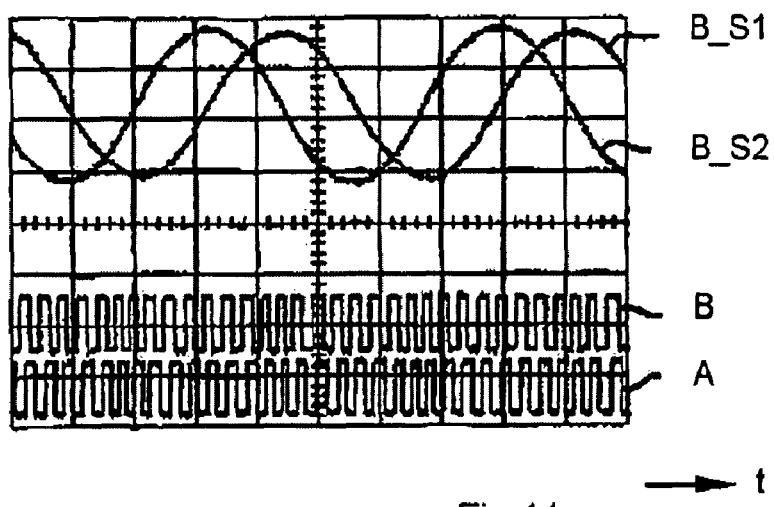
FIGS. 11 to 14 depict rotor position signals and corresponding pulse-shaped signals and commutation signals.

FIG. 11 shows an example of a time course 1100 of rotor position signals B_S1 and B_S2 that are generated by analog rotor position sensors 460 and 465 of FIG. 1, and of digital signals A and B determined therefrom. According to FIG. 11, sine signal B_S1 and cosine signal B_S2, as well as digital signals A and B corresponding thereto, are each depicted for a period of time that encompasses one complete mechanical revolution of sensor magnet 82 and of rotor 14 of electric motor 10 of FIG. 1.

As is evident from FIG. 11, rotor position signals B_S1 and B_S2 on the one hand, and digital signals A and B on the other hand, each exhibit a phase offset of 90° from one another. Each of the digital signals A and B comprises 32 pulses for the depicted mechanical revolution of sensor magnet 82.

Figure 12:
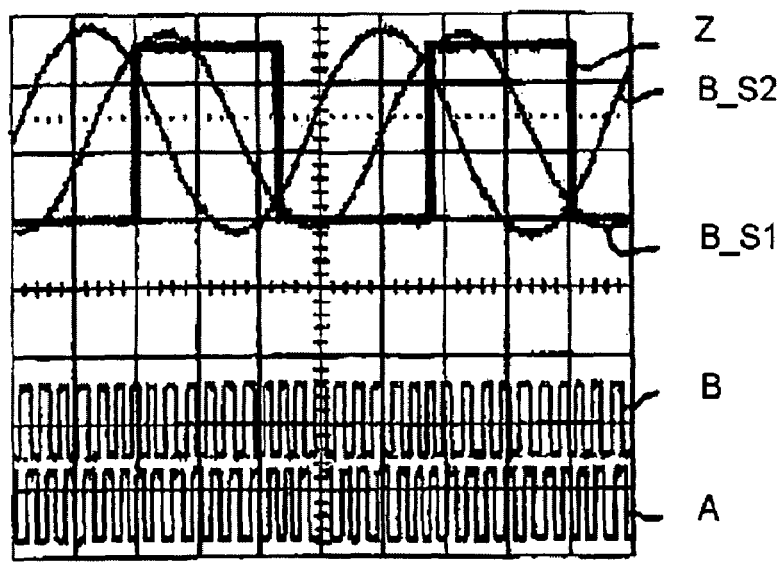

FIG. 12 shows a further example of a time course 1200 of rotor position signals B_S1 and B_S2, and of digital signals A and B generated therefrom, for a period of time that encompasses one complete mechanical revolution of sensor magnet 82 and of rotor 14 of electric motor of FIG. 1. In contrast to time course 1100 of FIG. 11, time course 1200 is depicted at a different scale.

In addition, time course 1200 shows an example of a Z signal that is preferably ascertained from rotor position signals B_S1 and B_S2. As is evident from FIG. 12, signal Z changes its value from LOW to HIGH, or vice versa, whenever signals B_S1 and B_S2 have the same value.

Figure 13:
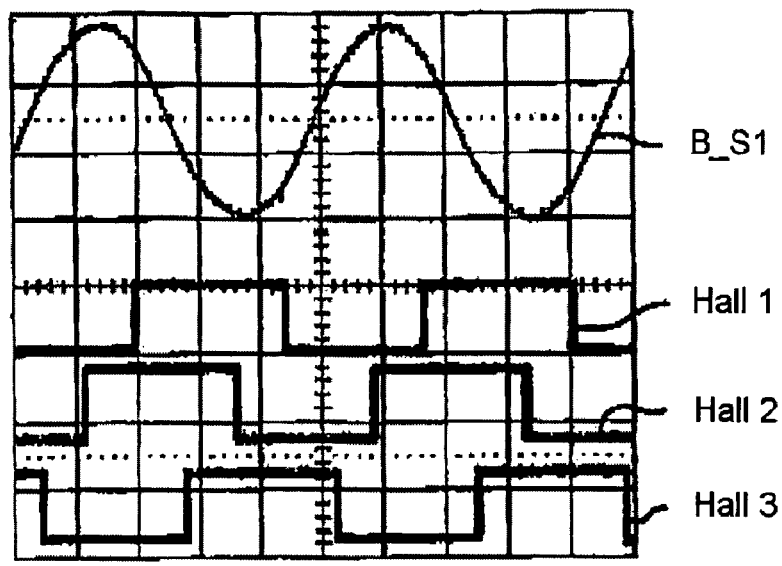

FIG. 13 shows an example of a time course 1300 of rotor signal B_S1, and of rotor position signals Hall 1, Hall 2, and Hall 3, that are generated by digital rotor position sensors 52, 54, 56 (FIG. 8). According to FIG. 13, signals B_S1, Hall 1, Hall 2, Hall 3 are depicted for a period of time that encompasses one complete mechanical revolution of sensor magnet 82 and of rotor 14 of electric motor 10 of FIG. 1.

Figure 14:
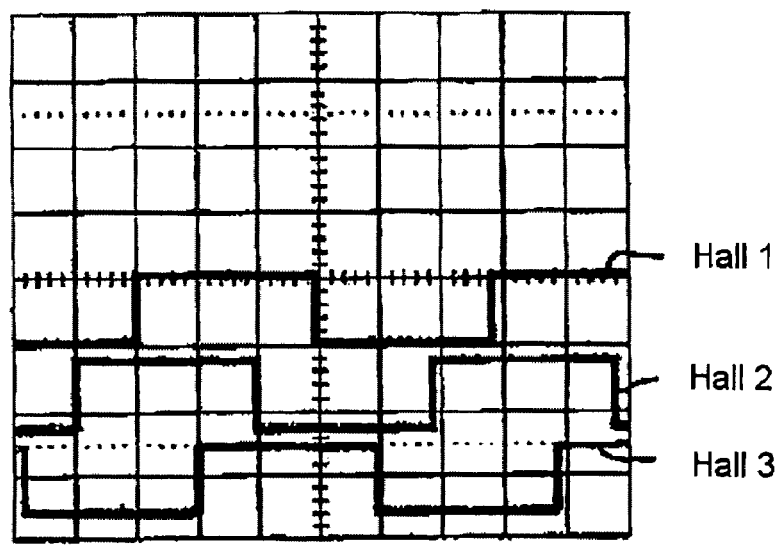

As FIG. 13 shows, rotor position signals Hall 1, Hall 2, Hall 3 each have a phase offset of 60° from one another. This phase offset is illustrated, in time course 1400 shown by way of example in FIG. 14, by a modified scale.

The invention makes it possible, with minimal complexity, to generate signals A, B that enable, even at low rotation speeds, very exact continuous determination of rotation speed and exact regulation of low rotation speeds.

Many variants and modifications are of course possible within the scope of the present invention.

The invention claimed is:

1. An electric motor (10) which comprises:
   a stator (12),
   a rotor (14) rotatable about a rotation axis (85) having a sensor magnet (82) with an even-numbered plurality of sensor poles (71, 72, 73, 74), said sensor magnet (82) being formed with a magnetic flux density distribution producing a magnetic flux which, over an angular sector, has a sinusoidal profile;
   a shaft (87) and a bearing tube (20) for rotatably supporting said sensor magnet (82), the shaft (87) and sensor magnet (82) being rotatably supported in the bearing tube (20);
   at least two analog rotation sensors (460, 465) for producing rotor position signals (B_S1, B_S2) which signals characterize the magnetic flux density of the magnetic flux acting, from the sensor magnet (82), on the respective sensor (460, 465), and which analog rotor position sensors (460, 465) are arranged adjacent a periphery of the sensor magnet (82) and outside said bearing tube (20), on a common flat support arrangement (468) that is parallel to the rotation axis (85) of the sensor magnet, near a point at which said arrangement is intersected by a first plane (470) perpendicular to the rotation axis (85),
   said analog rotor position sensors (460, 465) being arranged on the support arrangement (468) at a distance from one another, such that, during operation, they generate two sinusoidal signals having a phase shift of 90° with respect to each other; and
   a signal generator (90) for generating at least one pulse-shaped signal (A, B) from the two sinusoidal rotor position signals (B_S1, B_S2) that are phase-shifted by 90°.

2. The electric motor of claim 1, wherein
   said bearing tube comprises magnetically transparent material, at least in a region located between said sensor magnet (82) and said common flat support arrangement (468).

3. An electric motor (10) comprising:
   a stator (12),
   a rotor (14) rotatable about a rotation axis (85) having a sensor magnet (82) with an even-numbered plurality of sensor poles (71, 72, 73, 74), said sensor magnet (82) being formed with a magnetic flux density distribution producing a magnetic flux which, over an angular sector, has a sinusoidal profile;
   a shaft (87) and a bearing tube (20) for rotatably supporting said sensor magnet (82), the shaft (87) and sensor magnet (82) being rotatably supported in the bearing tube (20);

three rotor position sensors (52, 54, 56), generating respective digital rotor position signals are provided, arranged outside said bearing tube (20) on a stator side of said motor on a common flat support arrangement (468) that is parallel to a rotation axis (85) of said sensor magnet (82), adjacent a periphery of the sensor magnet (82), near a point at which said support arrangement (468) is intersected by a second plane (472) extending perpendicularly to the rotation axis (85), which second plane is at a predetermined distance from the first plane (470), each rotor position signal characterizing the magnetic flux density of the magnetic flux acting from the sensor magnet (82) on the respective one of said sensors, said rotor position sensors being arranged on the support arrangement (468) at a distance from one another, such that, during operation, they generate respective sinusoidal signals having a phase shift of 90° with respect to each other; and a signal generator (90) for generating at least one pulse-shaped signal A B from the sinusoidal rotor position signals B_S1, B_S2 that are phase-shifted by 90°.

4. The electric motor of claim 3, wherein said three digital rotor position sensors are aligned in a row (G) such that a middle one (54) of said sensors is arranged at a shortest distance (d) from said sensor magnet (82); and the remaining two rotor position sensors (52, 56) on each side of said middle one (54) are arranged at identical distances (a, b) from said sensor magnet (82).

5. The electric motor of claim 1, wherein said rotor (14) is a permanent-magnet rotor, interacting magnetically with said stator (12), and is formed with a number of poles matching a number, of poles of said sensor magnet (82).

6. The electric motor of claim 1, wherein the signal generator (90) is adapted to produce a position signal (Z) from which an absolute value for the rotational position of the rotor can be derived.

7. The electric motor of claim 1, wherein the signal generator (90) is adapted to create, in dependence upon said sinusoidal rotor position signals (B_S1, B_S2), two signal sequences (A, B) staggered about 90° with respect to each other, each sequence having a predetermined pulse count per sinusoidal period.

8. The electric motor of claim 1, wherein said support arrangement (468) is oriented with a closest point (474) to said sensor magnet (82) at a distance (d) therefrom, and wherein the analog rotor position sensors (460, 465) are arranged symmetrically with respect to said closest point (474).

9. The electric motor of claim 1, wherein said sensor magnet (82) has a pole-oriented magnetization pattern.

10. The electric motor of claim 1, wherein said sensor magnet (82) has a lateral magnetization pattern.

11. The electric motor of claim 1, wherein the analog rotor position sensors (460, 465) are arranged in a way which permits them to detect a tangential component (B_t) of the magnetic flux (B) created by said sensor magnet (82).

12. The electric motor of claim 1, wherein the analog rotor position sensors (460, 465) are arranged in a sensor plane (469) that does not extend perpendicularly to the rotation axis (85).

13. The electric motor of claim 1, wherein with respect to a height defined along a geometric projection of the shaft (87) of said rotor (14), said rotor position sensors (460, 465) and said sensor magnet (82) are at substantially the same height.

14. The electric motor of claim 13, wherein the sensor magnet (82) is arranged between said shaft (87) and the analog rotor position sensors (460, 465).

15. The electric motor of claim 3, wherein the first plane (470) perpendicular to the rotation axis (85) extends through the sensor magnet (82).

16. The electric motor of claim 3, wherein the second plane (472) perpendicular to the rotation axis (85) extends through the sensor magnet (82).

17. The electric motor of claim 3, wherein said rotor (14) is a permanent-magnet rotor, interacting magnetically with said stator (12), and is formed with a number of poles matching a number of poles of said sensor magnet (82).

\* \* \* \* \*